United States Patent [19]

Compton et al.

[11] 3,892,836

[45] July 1, 1975

[54] SINTERED $NO_x$ REDUCTION CATALYSTS

[75] Inventors: William A. Compton; Joseph F. Nachman; Manfred I. Seegall, all of San Diego, Calif.

[73] Assignee: International Harvester Company, San Diego, Calif.

[22] Filed: Jan. 7, 1974

[21] Appl. No.: 431,423

[52] U.S. Cl............................ 423/213.2; 252/462
[51] Int. Cl........................ B01d 53/34; B01j 11/06
[58] Field of Search.................. 423/213.2; 252/462

[56] References Cited
UNITED STATES PATENTS

| | | | |
|---|---|---|---|
| 3,524,721 | 8/1970 | Stephens | 252/462 |
| 3,545,917 | 12/1970 | Stephens | 252/462 |
| 3,830,756 | 8/1974 | Sanchez et al. | 423/213.2 |

FOREIGN PATENTS OR APPLICATIONS

| | | |
|---|---|---|
| 733,027 | 4/1966 | Canada |

*Primary Examiner*—G. O. Peters
*Attorney, Agent, or Firm*—Strauch, Nolan, Neale, Nies & Kurz

[57] ABSTRACT

Catalysts for reducing nitrogen oxides which contain praseodynium and cerium oxides.

5 Claims, 1 Drawing Figure

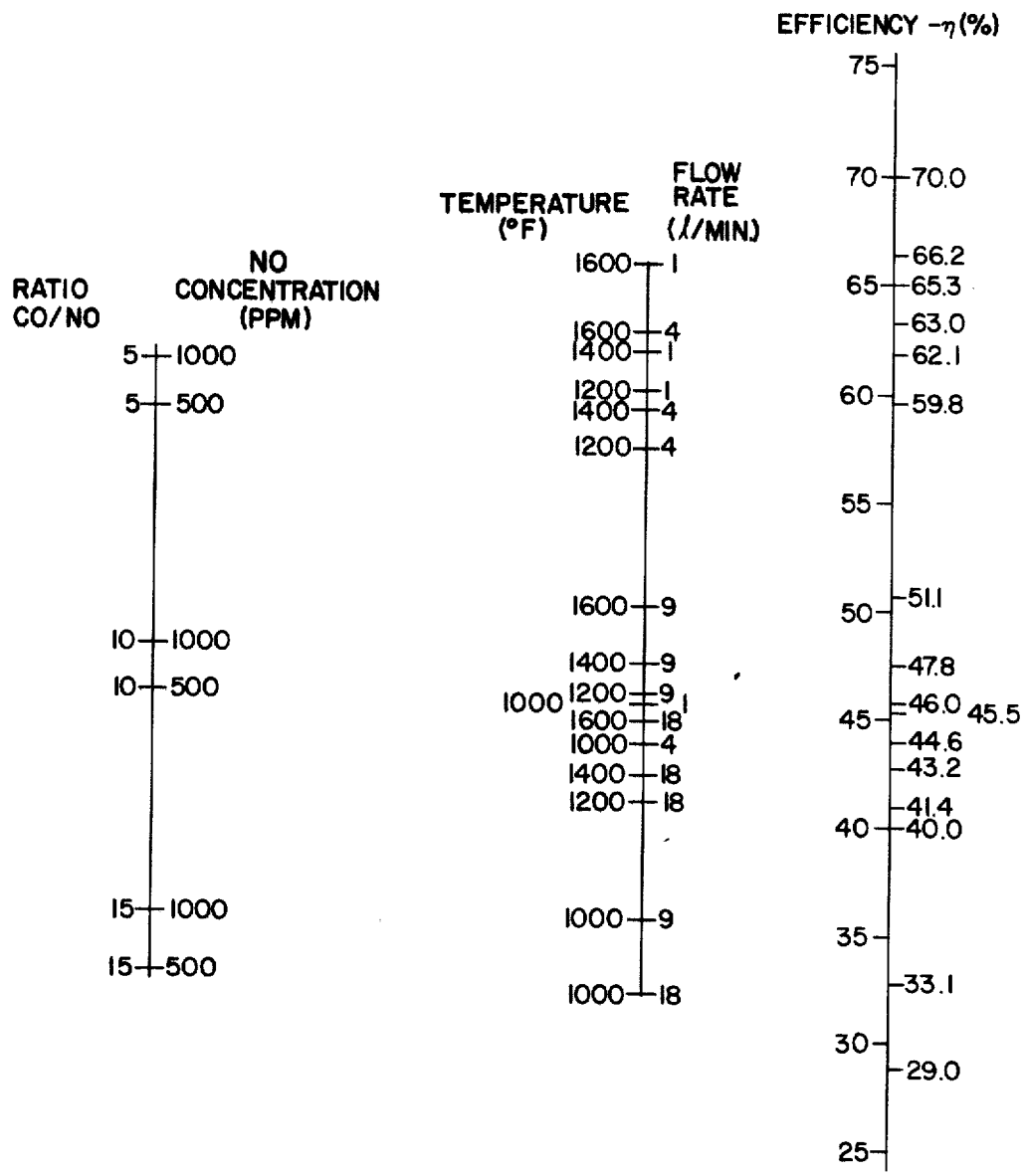

SINTERED NO$_x$ REDUCTION CATALYSTS

The present invention relates to novel, improved catalysts for eliminating nitrogen oxides from exhaust and other gases.[1]

[1] Nitrogen dioxide and nitrous oxide are sometimes individually, and collectively, referred to herein by the shorthand expression NO$_x$.

One of the greatest sources of pollution in this country is the internal combustion engine, particularly in its automotive applications.

Automobile engines release three types of pollutants into the atmosphere: carbon monoxide, nitrogen oxides, and unburned hydrocarbons. Of the total burdene of these pollutants added daily to the atmosphere, the automobile accounts for approximately 40 percent of the nitrogen oxides, 60 percent of the unburned hydrocarbons, and 64 percent of the carbon monoxide.

All of the foregoing pollutants are important. The first two are particularly so because they react under the influence of sunlight to form photochemical smog.

One obvious approach to the elimination of exhaust gas pollutants from the atmosphere is to remove them from the exhaust gases before the latter are released into the atmosphere. There are different ways of accomplishing this; one which has proven effective is the catalytic reduction of the nitrogen oxides to nitrogen followed by the oxidation of the carbon monoxide and hydrocarbons to carbon dioxide and water. Major efforts have been devoted to this approach, but a truly satisfactory catalyst has not yet materialized. High cost, susceptibility to poisoning and contamination, and a low degree of effectiveness continue to be vexing problems.

We have now discovered certain novel, improved catalysts in which these deficiencies are to a considerable extent overcome.

Our novel catalysts are mixtures of cerium oxide of the formula $CeO_2$ and praseodynium oxides of the formula $PrO_x$ where $x$ is between 1.5 and 2.0. This method of denoting praseodynium oxide has been adopted herein because the change from $PrO_2$ to $Pr_2O_3$ occurs in nine steps or phases.

The composition of the catalyst can range from 25 percent cerium oxide and 75 percent $PrO_x$ up to 75 percent cerium oxide and 25 percent $PrO_x$.

The rare earth oxide mixtures can be formed into pellets and sintered to increase their structural stability. Or they can be coated onto supports such as alumina pellets.

One advantage of the novel NO$_x$ reduction catalysts described herein is that they are economical. Another is that they can be chemically regenerated if they become poisoned.

That a mixture of cerium and praseodynium oxides is a more effective NO$_x$ reduction catalyst than either of its constituent oxides is surprising because other mixtures of rare earth oxides have been found in our studies to generally be inferior to the simple oxides. We have found that mixtures of cerium and lanthanum oxides are less effective than cerium oxide and that didymium oxide (a mixture of praseodynium and neodynium oxides) is physically unstable in pelleted form. We have also found that a mixture of praseodynium oxide and commercial rare earth oxides was relatively ineffective.

The use of simple lanthanum, praseodynium, and neodynium oxides as nitrogen oxide reduction catalysts and the use of the latter as a promoter for nickel oxide NO$_x$ reduction catalysts are disclosed in Stephens' U.S. Pat. Nos. 3,483,138 issued Dec. 9, 1969; 3,524,721 issued Aug. 18, 1970; 3,552,913 issued Jan. 5, 1971; and 3,545,917 issued Dec. 8, 1970. The last-identified patent also states that mixtures of lanthanum and praseodynium oxides can be used as nitrogen oxide reduction catalysts although no catalysts of this character are disclosed. This is not surprising in view of applicants' above-discussed findings that lanthanum has an inhibiting effect on the activity of the related cerium oxide as a NO$_x$ reduction catalyst.

From the foregoing, it will be apparent that a primary object of our invention resides in the provision of novel, improved methods for removing nitrogen oxides from gases.

Another primary object of the invention resides in the provision of novel, improved NO$_x$ reduction catalysts for use in such processes.

Yet another important object of the invention resides in the provision of novel, improved NO$_x$ reduction catalysts which are cerium oxide/praseodynium oxide mixtures.

Other objects and advantages and further important features of the invention will become apparent from the appended claims and as the ensuing detailed description and discussion proceeds in conjunction with the accompanying drawing, which is a nomograph of results obtained in a series of tests designed to ascertain the performance of an exemplary catalyst embodying the principles of the present invention.

The amount of binder employed will typically be on the order of four percent by weight of the total combination. Our catalysts can be prepared by mixing the cerium and praseodynium oxides until homogeneous and then mixing with the oxide mixture a binder such as stearic acid, Carbowax,[2] or the like.

[2] "Carbowax" is a trademark for polythylene and methoxypolyethylene glycols. The polyethylene glycols have molecular weights ranging from 200 to 20,000; and the methoxypolyethylene glycols are available in molecular weights of 350, 550, and 750.

The binder, rare earth oxide mixture is pressed into pellets. The pellets are introduced into a furnace and slowly heated, the temperature typically being increased at a rate of 50°F. per hour for up to 18 hours and then at a rate of 100°F. per hour until a maximum sintering temperature of 1,600°–2,200°F. is attained (if it has not already been reached). The pellets are kept at the maximum sintering temperature for 1 to 5 hours and then allowed to cool to room temperature with the furnace so they will cool slowly. The cooled pellets are removed from the furnace and are ready for use.

One typical catalyst made in the manner described above consisted of 75 percent by weight cerium oxide ($CeO_2$) and 25 percent by weight praseodynium oxide ($PrO_x$ where $x = 1.83$). The pellets were porous right cylinders having a diameter of 0.2 inch and a length of 0.2 inch. Batches of pellets having surface areas ranging from 0.4 to 0.8 square meters per gram were prepared.

The catalyst pellets were loaded into an instrumented reaction chamber one inch in diameter until a bed seven inches deep was formed.

The performance of the catalyst was ascertained by circulating through the catalyst bed synthetic gas mixtures formulated to approximate the composition of an automobile exhaust at an air/fuel ratio of about 14:1. Four compositions, A, B, C, and D, were used. The compositions of the gas mixtures in so far as the constituent. significant to the tests are concerned were as follows:

TABLE I

| Gas Mixture Code | Nominal NO ppm | CO/NO Ratio | Nominal O₂ ppm |
|---|---|---|---|
| A | 1080 | 10 | 2900 |
| B | 1080 | 5 | 2900 |
| C | 540 | 10 | 725 |
| D | 540 | 5 | 725 |

A complete analysis for composition A is shown in Table II below. The compositions of the other three synthetic gas mixtures were similar.

TABLE II

| Component | ppm | Percent | Range of Accuracy |
|---|---|---|---|
| NO | 1,080 | 0.1 | ±10% |
| CO | 10,500 | 1.0 | ±10% |
| CO₂ | 160,000 | 16.0 | ±8.5% |
| O₂ | 2,900 | 0.29 | ±10% |
| C₃H₈ | 300 | trace | ±10% |
| H₂ | 530 | trace | ±10% |
| H₂O | 100,000 | 10.0 | ±10% |
| N₂ | 724,690 | 72.5 | ±10% |

Five flow rates were employed to cover the entire range of driving conditions as shown in Table III below.

TABLE III

| Flowrate Code | Car Mode | Car Flowrate CFM | Test Flowrate cc/min |
|---|---|---|---|
| 1 | Decelerating | 5 | 460 |
| 2 | Idling | 10 | 1000 |
| 3 | Partial Load, Cruising | 45 | 4000 |
| 4 | Full Load, Cruising | 100 | 9000 |
| 5 | Accelerating | 200 | 18000 |

Catalyst performance was ascertained at temperatures of 600° to 1,600°F. in 200° increments.

The performance of the catalyst under the various test conditions was evaluated in terms of its NO reduction efficiency ($\eta$) in accord with the following formula:

$$\eta = \frac{\text{Initial NO Concentration} - \text{Final CO Concentration}}{\text{Initial NO Concentration}} \times 100$$

Reduction of carbon monoxide concentration can be employed as a measure of catalyst efficiency because the (overall) reaction for the elimination of the nitrogen oxide is:

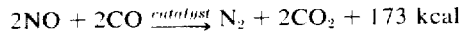

$$2NO + 2CO \xrightarrow{catalyst} N_2 + 2CO_2 + 173 \text{ kcal}$$

The results of the tests are summarized in the drawing which is a standard nomograph type chart of the test data with the CO/NO scale extended to 15:1. To use the nomograph, a point identifying a particular CO/NO ratio and NO concentration is connected to a point associated with a particular catalyst bed temperature and flowrate and the line extended to the efficiency scale.

The nomograph shows that the catalyst was effective, its efficiency increasing as the CO/NO concentration of the gas mixture and the bed temperature increased and the flowrate of the synthetic gas decreased.[3]

[3] Subsequent tests have shown that the NO₂ reduction efficiencies of our novel catalysts can be increased to over 90 percent by eliminating water vapor from the gas mixtures contacted with the catalyst.

[3] subsequent tests have shown that the NO₂ reduction efficiencies of our novel catalysts can be increased to over 90 percent by eliminating water vapor from the gas mixtures contacted with the catalyst.

To ascertain the resistance of our catalysts to spalling, a common failing of many catalysts, a sample of the exemplary catalyst described above was weighed and then kept for five days in an environment in which the average temperature was 74°F. and the relative humidity was 100 percent. The catalyst was then removed, weighed, and heated to 200°F. in one hour and then to 860°F. in a second hour under a constant 7,600 cc per minute flow of high purity helium. The catalyst was again weighed and photographed.

The catalyst gained weight in the high humidity environment by the adsorption of moisture; and the final weight was lower than the initial weight, indicating that moisture had adsorbed on the catalyst prior to the beginning of the test.

There was no change in the appearance of the catalyst; i.e., no evidence of spalling or other deterioration.

To show that poisoned catalysts as described herein can be chemically regenerated, the exemplary catalyst described above was desiccated, placed in a retort with a boat containing lead oxide and lead bromide, and heated in a furnace. The catalyst was removed at the end of the two hours, weighed and returned to the furnace and exposed to the heated fumes for an additional three hours.

At the end of the five hour period the lead salts had completely boiled away. The interior of the retort and its contents were coated with lead.

The catalyst was removed from the retort, placed in a test tube with dilute nitric acid, and heated in a boiling water bath. After 75 minutes the liquid fraction was recovered and treated with sulfuric acid. White lead sulfate crystals precipitated.

The washing step was repeated until no precipitate formed. The catalyst was then rinsed in distilled water, dried, and weighed.

A small (4 percent) overall weight loss was noted. This and the recovery of the lead from the wash liquid indicated that the catalyst had been freed of the lead deposited on it. A visual inspection did not reveal any deterioration in the catalyst.

Our novel catalysts can be used in any desired manner providing intimate contact between the catalyst and the gas stream from which nitrogen oxides are to be eliminated. In eliminating pollutants from internal combustion engine exhausts, for example, they may be used in so-called catalytic mufflers such as those referred to in the above-identified Stephens patents.

Our catalysts may be used in conjunction with oxidation catalysts to eliminate carbon monoxide and unburned hydrocarbons as well as nitrogen oxides from gas streams. They may also be used to eliminate nitrogen oxides from gases other than those generated by internal combustion engines—for example, they can be employed to eliminate nitric oxide from the discharge stream of plants employing the ammonia process of making nitric acid.

To effect the desired reaction, the gas must be contacted with the catalyst at an elevated temperature. The minimum temperature at which we have found any appreciable catalytic activity is 600°F. Increased catalytic activity is obtained at temperatures of 1,200°F. and higher. The maximum temperature which can be employed is generally limited by the temperature of the gas to be treated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In the elimination of nitrogen oxides from a gas stream by bringing the gas into contact with a nitrogen oxide reducing catalyst, the improvement wherein the gas stream is contacted at a temperature of at least 600°F. with a catalyst which consists essentially of from 25 to 75 percent praseodymium oxide of the formula $PrO_x$ where $x$ is 1.5 to 2.0 and from 75 to 25 percent of a cerium oxide.

2. The method of claim 1, wherein said gas stream is contacted with said catalyst at a temperature of at least 1,200°F.

3. The method of claim 1, wherein the gas stream is an internal combustion engine exhaust.

4. A nitrogen oxide reduction catalyst which consists essentially of from 25 to 75 percent praseodynium oxide of the formula $PrO_x$ where $x$ is 1.5 to 2.0 and from 75 to 25 percent of a cerium oxide.

5. Porous, sintered catalyst pellets in which the catalyst consists essentially of from 25 to 75 percent praseodymium oxide of the formula $PrO_x$ where $x$ is 1.5 to 2.0 and from 75 to 25 percent of a cerium oxide.

* * * * *

UNITED STATES PATENT OFFICE
CERTIFICATE OF CORRECTION

PATENT NO. : 3,892,836
DATED : July 1, 1975
INVENTOR(S) : William A. Compton, et al It is certified that error appears in the above-identified patent and that said Letters Patent are hereby corrected as shown below:

In the Abstract, change "praseodynium" to --praseodymium--.

Column 1, line 12, change "burdene" to --burden--.

Column 1, line 37, change "praseodynium" to --praseodymium--.

Column 1, line 39, change "praseodynium" to --praseodymium--.

Column 1, line 53, change "praseodynium" to --praseodymium--.

Column 1, line 60, change "praseodynium" to --praseodymium--.

Column 1, line 61, change "neodynium" to --neodymium--.

Column 1, line 63, change "praseodynium" to --praseodymium--.

Column 1, line 65, change "praseodynium" to --praseodymium--.

Column 1, line 66, change "neodynium" to --neodymium--.

Column 2, line 6, change "praseodynium" to --praseodymium--.

Column 2, line 21, change "praseodynium" to --praseodymium--.

Column 2, line 34, change "praseodynium" to --praseodymium--.

Column 2, line 53, change "praseodynium" to --praseodymium--.

Column 3, line 1, change "uent." to --uents--.

Column 4, delete footnote 3 (second occurrence).

Column 6, line 11, change "praseodynium" to --praseodymium--.

Signed and Sealed this fourteenth Day of October 1975

[SEAL]

Attest:

RUTH C. MASON
Attesting Officer

C. MARSHALL DANN
Commissioner of Patents and Trademarks